United States Patent
Sunagawa et al.

(10) Patent No.: US 6,610,757 B2
(45) Date of Patent: *Aug. 26, 2003

(54) FOAMABLE VINYL CHLORIDE RESIN COMPOSITION

(75) Inventors: Takenobu Sunagawa, Takasago (JP); Mitsutaka Sato, Kobe (JP); Noriko Sakashita, Akashi (JP); Mamoru Kadokura, Takasago (JP)

(73) Assignee: Kaneka Corporation, Osaka (JP)

( * ) Notice: Subject to any disclaimer, the term of this patent is extended or adjusted under 35 U.S.C. 154(b) by 64 days.

This patent is subject to a terminal disclaimer.

(21) Appl. No.: 09/926,428

(22) PCT Filed: Mar. 15, 2001

(86) PCT No.: PCT/JP01/02050
§ 371 (c)(1),
(2), (4) Date: Oct. 31, 2001

(87) PCT Pub. No.: WO01/70862
PCT Pub. Date: Sep. 27, 2001

(65) Prior Publication Data
US 2002/0198276 A1 Dec. 26, 2002

(30) Foreign Application Priority Data
Mar. 21, 2000 (JP) ......................................... 2000-078448

(51) Int. Cl.[7] .................................................. C08J 9/08
(52) U.S. Cl. .................... 521/134; 521/95; 521/145; 521/139; 521/93; 521/79; 521/81
(58) Field of Search ................................. 521/134, 145, 521/95, 93, 139, 79, 81

(56) References Cited

U.S. PATENT DOCUMENTS

| | | | |
|---|---|---|---|
| 3,879,313 A | | 4/1975 | Huntzinger et al. |
| 4,025,465 A | | 5/1977 | Dorrn et al. |
| 4,402,893 A | * | 9/1983 | Kitamura et al. |
| 4,427,795 A | * | 1/1984 | Dorrestijn et al. |
| 4,722,944 A | | 2/1988 | Mori et al. |
| 4,797,426 A | | 1/1989 | Waki et al. |
| 4,800,214 A | | 1/1989 | Waki et al. |
| 5,532,055 A | | 7/1996 | Igarashi et al. |
| 5,712,319 A | | 1/1998 | Suzuki et al. |

FOREIGN PATENT DOCUMENTS

| | | | |
|---|---|---|---|
| JP | 50-126071 | | 10/1975 |
| JP | 55-139435 | | 10/1980 |
| JP | 55-149328 | | 11/1980 |
| JP | 60-8330 | | 1/1985 |
| JP | 1-274702 | | 11/1989 |
| JP | 4-239046 | | 8/1992 |
| JP | 6-9813 | | 1/1994 |
| JP | 9-151269 | | 6/1997 |
| JP | 9-239707 | | 9/1997 |
| JP | 10-36606 | * | 2/1998 |
| JP | 10-101832 | | 4/1998 |
| JP | 10-182911 | | 7/1998 |
| JP | 11-92608 | | 4/1999 |
| JP | 2000-17095 | | 1/2000 |
| JP | 2001-89591 | | 4/2001 |
| JP | 2001-89592 | | 4/2001 |
| WO | WO97/33936 | | 9/1997 |

* cited by examiner

*Primary Examiner*—Morton Foelak
(74) *Attorney, Agent, or Firm*—Armstrong, Westerman & Hattori, LLP

(57) ABSTRACT

An expandable vinyl chloride resin composition that the expansion ratio of a vinyl chloride resin can be greatly increased by the use of thermally decomposable inorganic blowing agents without the use of organic solvent blowing agents, and which comprises 100 parts by weight of a vinyl chloride resin, 0.5 to 30 parts by weight of, as a processing aid, a (meth)acrylic acid ester polymer having a specific viscosity of not less than 0.73 measured at 30° C. with respect to a solution of 0.1 g of the polymer dissolved in 100 ml of chloroform, and not less than 0.3 to less than 2 parts by weight of a thermally decomposable inorganic blowing agent such as sodium bicarbonate.

6 Claims, No Drawings

FOAMABLE VINYL CHLORIDE RESIN COMPOSITION

TECHNICAL FIELD

The present invention relates to an expandable vinyl chloride resin composition, and more particularly to an expandable vinyl chloride resin composition which is excellent in processability and provides cellular molded articles having a high expansion ratio and having excellent physical properties.

BACKGROUND ART

Polyvinyl chloride resins provide molded articles excellent in physical properties such as impact resistance and heat resistance and in chemical properties such as solvent resistance, acid resistance and alkali resistance and, therefore, have been widely used in the field of building materials and other various fields. In recent years, foaming method attracts attention as a means for lightening of vinyl chloride resins and cost reduction of molded articles. Cellular molded articles of vinyl chloride resins having a high expansion ratio have been demanded strongly from the market.

In foaming of vinyl chloride resins, generally known is a method using a blowing agent in combination with a processing aid comprising methyl methacrylate as a main component.

It is known that it is possible to achieve foaming in a high expansion ratio when an easily volatile organic solvent blowing agent such as an aliphatic hydrocarbon or a halogenated aliphatic hydrocarbon is used as the blowing agent mentioned above.

For example, Japanese Patent Publications Kokoku No. 60-10540 and Kokoku No. 58-40986 disclose that foamed articles having an expansion ratio of several tens of times are obtained by impregnating a vinyl chloride resin with an organic solvent having a boiling point of not more than 90° C. such as butane or dichlorofluoromethane as a blowing agent or by directly introducing the organic solvent to an extruder during extrusion processing.

However, the use of an organic solvent blowing agent is disadvantageous in cost as compared with a thermally decomposable blowing agent, since equipments for the impregnation and for explosion proof are required in carrying out the molding.

On the other hand, in case of using a thermally decomposable blowing agent such as a thermally decomposable organic blowing agent or a thermally decomposable inorganic blowing agent, it is difficult under existing circumstances to raise the expansion ratio to more than about 3–4 times so long as it is desired to produce foamed articles having a smooth surface and to keep the cells thereof uniform and fine.

For example, Japanese Patent Publication Kokoku No. 63-9540 discloses an expandable vinyl chloride resin composition obtained by adding a methacrylate resin (polymethyl methacrylate having a degree of polymerization of 2,000 to 30,000, that is, a weight average molecular weight of 200,000 to 3,000,000) with a thermally decomposable organic blowing agent such as azodicarbonamide and a thermally decomposable inorganic blowing agent such as sodium bicarbonate and further with a filler such as calcium carbonate to a vinyl chloride resin having an average degree of polymerization of 500 to 800. It is disclosed that this expandable vinyl chloride resin composition is molded to give foamed articles having uniform and fine cells and having excellent surface property and surface hardness, but the expansion ratio is at most about 3–4 times.

Also, Japanese Patent Publication Kokai No. 6-9813 discloses an expandable vinyl chloride resin composition obtained by adding a methacrylate resin and a bicarbonate having a particle size of not more than 10 $\mu$m as a thermally decomposable blowing agent to a vinyl chloride resin. It is disclosed that this expandable vinyl chloride resin composition is molded to give foamed articles having uniform and fine cells and having good heat stability and weatherability, but no detail of the average molecular weight of methacrylate resin and the expansion ratio is disclosed therein.

Further, Japanese Patent Publication Kokai No. 9-151269 discloses an expandable vinyl chloride resin composition obtained by adding a polymethyl methacrylate resin having a weight average molecular weight of 4,500,000 to 7,000,000 and a thermally decomposable blowing agent to a vinyl chloride resin. It is disclosed that this expandable vinyl chloride resin composition is molded to give injection-molded foams having uniform cells without occurrence of decomposition of the resins. However, in the working examples thereof, as the polymethyl methacrylate resin is used only P-531 made by Mitsubishi Rayon Co., Ltd. (weight average molecular weight 4,700,000) and no evaluation in the vicinity of 7,000,000 in weight average molecular weight is made. Also, the obtained expansion ratios are at most about 2–3 times.

It is an object of the present invention to provide an expandable vinyl chloride resin composition according to which the expansion ratio can be markedly increased by the use of a thermally decomposable blowing agent without using any organic solvent-based blowing agent in the foaming.

A further object of the present invention is to provide an expandable vinyl chloride resin composition which provides foamed articles having an expansion ratio of at least 4, especially at least 5, and having uniform and fine cells by the use of a thermally decomposable blowing agent.

DISCLOSURE OF INVENTION

The present inventors have found that a composition capable of greatly increasing the expansion ratio as compared with conventional compositions containing a thermally decomposable blowing agent is obtained by adding a specific (meth)acrylic acid ester polymer and a thermally decomposable inorganic blowing agent to a vinyl chloride resin.

In accordance with the present invention, there is provided an expandable vinyl chloride resin composition comprising (a) 100 parts by weight of a vinyl chloride resin, (b) 0.5 to 30 parts by weight of, as a processing aid, a (meth)acrylic acid ester polymer having a specific viscosity of not less than 0.73 measured at 30° C. with respect to a solution of 0.1 g of the polymer dissolved in 100 ml of chloroform, and (c) not less than 0.3 to less than 2 parts by weight of a thermally decomposable inorganic blowing agent.

Sodium bicarbonate is particularly preferred as the thermally decomposable inorganic blowing agent.

The feature of the present invention resides in that a polymer which is obtained by emulsion polymerization of a monomer mixture containing a predominant amount of a methacrylic acid ester and/or an acrylic acid ester and which has a high molecular weight is used as a processing aid for vinyl chloride resins. By using such a processing aid together with a thermally decomposable inorganic blowing agent, the effect that the expansion ratio in the foaming can be increased without impairing excellent physical and chemical properties that the vinyl chloride resins originally possess can be remarkably exhibited with the addition of small amounts thereof.

The present inventors already made an invention concerning an expandable vinyl chloride resin composition utilizing water or a material capable of generating steam by heating it as a blowing agent. Accordingly, the present invention excludes using water or a material capable of generating water by the heating in an amount capable of substantially expand a vinyl chloride resin.

BEST MODE FOR CARRYING OUT THE INVENTION

The vinyl chloride resins used in the present invention are not particularly limited, and any of conventionally used vinyl chloride resins can be used in the present invention. Homopolymer and copolymers composed of 80 to 100% by weight of units of vinyl chloride and 0 to 20% by weight of units of other monomers copolymerizable with vinyl chloride are preferable.

Examples of the other monomer copolymerizable with vinyl chloride are, for instance, vinyl acetate, propylene, styrene, an acrylic acid ester (e.g., alkyl acrylates having a $C_1$ to $C_8$ alkyl group such as methyl acrylate, ethyl acrylate, butyl acrylate and octyl acrylate), and other vinyl monomers. These vinyl monomers may be used alone or in admixture thereof.

The average degree of polymerization of the vinyl chloride resin is not particularly limited, but vinyl chloride resins having an average degree of polymerization of about 400 to about 1,000 are usually employed.

Such vinyl chloride resins include, for instance, polyvinyl chloride, copolymers of not less than 80% by weight of units of vinyl chloride and not more than 20% by weight of units of other copolymerizable monomer such as vinyl acetate, propylene, styrene or an acrylic acid ester, a chlorinated polyvinyl chloride, and the like. These may be used alone or in admixture thereof.

The processing aid is a component used for the purpose of improving the expandability of the vinyl chloride resin.

In the present invention, as the processing aid are used (meth)acrylate homopolymer or copolymers obtained by emulsion polymerization of a monomer mixture (hereinafter also referred to as "monomer mixture (M)") containing a predominant amount of a methacrylic acid ester and/or an acrylic acid ester, especially methyl methacrylate. These polymers are important to have a high molecular weight, and the specific viscosity thereof measured at 30° C. with respect to a solution of 0.1 g of the polymer dissolved in 100 ml of chloroform is at least 0.73, preferably from 0.73 to 3, more preferably from 0.73 to 1.7, further preferably from 0.8 to 1.6, still further preferably from 0.9 to 1.5. If the specific viscosity is less than 0.73, sufficient expandability is not obtained. Also, if the specific viscosity exceeds 1.7, the expandability tends to lower. The specific viscosity 0.73 corresponds to about 7,300,000 in terms of weight average molecular weight of the (meth)acrylic acid ester polymer.

The specific viscosity can be adjusted by means of the ratio of polymerization initiator to monomer or the amount of chain transfer agent such as mercaptan.

Preferably, the above-mentioned monomer mixture (M) is a mixture of 50 to 100% by weight of methyl methacrylate and 0 to 50% by weight of a monomer selected from an acrylic acid ester and a methacrylic acid ester excepting methyl methacrylate, especially a mixture of at least 50% by weight of methyl methacrylate and at least 10% by weight of a monomer selected from an acrylic acid ester and a methacrylic acid ester excepting methyl methacrylate. The monomer mixture may further contain other vinyl monomers copolymerizable with the (meth)acrylic acid esters.

Examples of the methacrylic acid ester excepting methyl methacrylate are, for instance, ethyl methacrylate, propyl methacrylate, butyl methacrylate, 2-ethylhexyl methacrylate and other alkyl methacrylates. Alkyl methacrylates having a $C_2$ to $C_8$ alkyl group, especially a $C_2$ to $C_4$ alkyl group, are preferred. Examples of the acrylic acid ester are, for instance, methyl acrylate, ethyl acrylate, propyl acrylate, butyl acrylate, 2-ethylhexyl acrylate and other alkyl acrylates. Alkyl acrylates having a $C_1$ to $C_8$ alkyl group, especially a $C_2$ to $C_4$ alkyl group, are preferred. These acrylates and methacrylates excepting methyl methacrylate may be used alone or in admixture thereof.

Examples of the other vinyl monomer are, for instance, an aromatic vinyl compound such as styrene or α-methylstyrene, an unsaturated nitrile compound such as acrylonitrile, and the like. These may be used alone or in admixture thereof.

The proportions of the respective components in the monomer mixture (M) are from 50 to 100% by weight, preferably 50 to 90% by weight, more preferably 60 to 85% by weight, of methyl methacrylate, and from 0 to 50% by weight, preferably 10 to 40% by weight, more preferably 15 to 30% by weight, of a monomer selected from the methacrylic acid ester excepting methyl methacrylate and the acrylic acid ester, and from 0 to 20% by weight, preferably 0 to 10% by weight, more preferably 0 to 5% by weight, of the other copolymerizable vinyl monomer.

If the proportion of methyl methacrylate in the monomer mixture (M) is less than 50% by weight, the processability and expandability are lowered. If the proportion of the monomer selected from an acrylic acid ester and a methacrylic acid ester excepting methyl methacrylate exceeds 50% by weight, the processability and expandability tend to be lowered. Further, if the proportion of the other vinyl monomer exceeds 20% by weight, the gelation ratio and expandability tend to be lowered.

The above-mentioned processing aid is obtained, for example, by emulsion-polymerizing the monomer mixture (M), using suitable dispersion medium, emulsifier, polymerization initiator and optionally chain transfer agent, in a known manner. The emulsion polymerization may be carried out in two stages or more, or may be carried out in a single stage.

The dispersion medium used in the emulsion polymerization is usually water.

Known emulsifiers are used. Examples of the emulsifier are, for instance, an anionic surfactant such as a fatty acid salt, an alkyl sulfate, an alkylbenzene sulfonate, an alkyl phosphate or a sulfosuccinic acid diester, and a non-ionic surfactant such as a polyoxyethylene alkyl ether or a polyoxyethylene fatty acid ester.

As the polymerization initiator are used water-soluble and oil-soluble polymerization initiators. For example, usual inorganic polymerization initiators such as a persulfate, organic peroxides or azo compounds may be used alone, or may be used as a redox system in combination with a sulfite, a thiosulfate, a primary metal salt, formaldehyde sodium sulfoxylate or the like. Preferable persulfates include, for instance, sodium persulfate, potassium persulfate, ammonium persulfate, and the like. Preferable peroxides include, for instance, t-butyl hydroperoxide, cumene hydroperoxide, benzoyl peroxide, lauroyl peroxide, and the like.

The chain transfer agent is not particularly limited. For instance, t-dodecylmercaptan, t-decylmercaptan, n-dodecylmercaptan, n-decylmercaptan and the like can be used.

The temperature and time of the emulsion polymerization reaction are not particularly limited and are suitably adjusted so as to obtain the desired specific viscosity and particle size in accordance with the purpose of use.

In case of carrying out the emulsion polymerization in two or more stages, the monomer of the next stage is added after confirming that the prior stage polymerization is completed, whereby the polymerization in each stage can be carried out without mixing of the next stage monomer with the prior stage monomer.

The particles in the thus obtained polymer latex have usually an average particle size of about 100 to about 3,000 Å (0.01 to 0.3 μm). The particles are taken out of the latex by salting out or coagulation by means of addition of a usual electrolyte, or spray drying in hot air. Also, as occasion demands, washing, dehydration, drying and the like are carried out in a usual manner.

In general, the processing aid obtained by the above-mentioned procedures is preferably a white powder having an average particle size of 30 to 300 μm from the viewpoint of incorporating it as a processing aid into a vinyl chloride resin.

The processing aid is used in an amount of 0.5 to 30 parts by weight, preferably 5 to 20 parts by weight, more preferably 8 to 20 parts by weight, per 100 parts by weight of a vinyl chloride resin. If the amount of the processing aid is less than 0.5 parts by weight, the effect to be produced by the addition of the processing aid is not sufficiently obtained. If the amount is more than 30 parts by weight, excellent mechanical properties of the vinyl chloride resin are impaired.

In the present invention, a thermally decomposable inorganic blowing agent is used as a blowing agent. The term "thermally decomposable inorganic blowing agent" as used herein means an inorganic compound capable of generating nitrogen gas, carbon dioxide gas, ammonia gas, oxygen gas and/or hydrogen gas. Examples of the thermally decomposable inorganic blowing agent used in the present invention are, for instance, sodium bicarbonate, potassium bicarbonate, ammonium bicarbonate, sodium carbonate, ammonium carbonate, and the like. These may be used alone or in admixture thereof. Of these, sodium bicarbonate is preferred from the viewpoints of expansion efficiency and cost.

The amount of the thermally decomposable inorganic blowing agent is selected in accordance with the purpose without particular restriction. According to the present invention, by the use of the processing aid as mentioned above an expansion ratio of about 5–10 can be achieved with the use of a small amount of the blowing agent. For example, the thermally decomposable inorganic blowing agent is used in an amount of from not less than 0.3 part by weight to less than 2 parts by weight per 100 parts by weight of a vinyl chloride resin. If the amount of the blowing agent is less than 0.3 part by weight, foamed articles having a sufficient expansion ratio are hard to be obtained.

Also, the amount of the thermally decomposable inorganic blowing agent may be changed in conformity with the amount of the processing aid. For example, it is preferable to use the blowing agent in an amount of, per 100 parts by weight of a vinyl chloride resin, 0.5 to 1.9 parts by weight when the processing aid is used in an amount of 5 parts by weight, 1.0 to 1.9 parts by weight when the processing aid is used in an amount of 10 parts by weight, and 1.5 to 1.9 parts by weight when the processing aid is used in an amount of 20 parts by weight.

The expandable vinyl chloride resin composition of the present invention may contain one or more of other additives such as stabilizer, lubricant, impact modifier, plasticizer, colorant, filler and the like, as occasion demands.

The process for preparing the expandable vinyl chloride resin composition of the present invention is not particularly limited. For example, the composition can be prepared in such a manner as mixing a vinyl chloride resin, the processing aid, a thermally decomposable inorganic blowing agent and other additives, and melt-kneading the mixture at an appropriate temperature by a melt kneader such as a twin screw extruder.

The method of the molding processing of the expandable vinyl chloride resin composition of the present invention is not particularly limited, and generally used molding methods such as extrusion are applicable.

The present invention is more specifically explained by means of examples and comparative examples, in which all parts and % are by weight unless otherwise noted. It is to be understood that the present invention is not limited to these examples.

Methods of evaluation used in the examples and comparative examples are shown below.
(Measurement of Specific Viscosity of Polymer Sample (Processing Aid))

In 100 ml of chloroform was dissolved 0.1 g of a polymer sample, and the measurement was carried out using a Ubbelohde's viscometer kept at a constant temperature in a water bath of 30° C.
(Measurement of Expansion Ratio)

After measuring the specific gravity of a obtained powder compound (non-foamed molding of vinyl chloride resin composition), the compound was molded by a small-size single screw extruder attached to a Laboplasto mill made by Toyo Seiki Kabushiki Kaisha to give a rod-like foamed article (foamed molding of vinyl chloride resin composition), and the specific gravity of the rod-like foamed article was measured. The expansion ratio was calculated from the measured values according to the following equation.

Expansion ratio=(specific gravity of non-foamed molding)/(specific gravity of foamed molding)

The specifications of extruder and the molding conditions are shown below.
Specifications of Extruder
Screw: L/D=20, compression ratio=2.7, number of rotation= 30 r.p.m.
Die: diameter=5 mm, land=20 mm
Molding Conditions
Molding temperature:
  C1=170° C., C2=175° C., C3=180° C.
  Die=185° C.
(Measurement of Polymerization Conversion)

The polymerization conversion was calculated according to the following equation.

Polymerization conversion (%)=(amount of produced polymer/amount of monomers charged)×100

(Measurement of Average Particle Size of Latex)

With respect to a latex obtained, the average particle size was measured using light scattering in a wavelength of 546 nm by a Spectrophotometer U-2000 made by Hitachi, Ltd.
(Evaluation of Cell State)

With respect to the cell state of a foamed article obtained, the appearance was visually observed and evaluated according to the following criteria.

○: The cell structure is uniform and the appearance is excellent.

Δ: Broken cells are scattered.

×: Most of cells are broken and the appearance is poor.

EXAMPLE 1

An 8 liter reactor equipped with a stirrer was charged with 0.7 part of sodium dioctylsuccinate dissolved in water as an emulsifier, and thereto was added water so that the total amount of water including water included in sub-raw materials added later became 200 parts. After passing a nitrogen gas through the gaseous phase and liquid phase of the reactor to expel oxygen from the space and water, the temperature of the content was elevated to 70° C. with stirring. To the reactor was then added at a time a first stage monomer mixture composed of 68 parts of methyl methacrylate (hereinafter also referred to as "MMA") and 12 parts of butyl acrylate (hereinafter also referred to as "BA"). Subsequently 0.01 part of potassium persulfate was added as an initiator, and stirring was continued for 1 hour to substantially complete the polymerization. A second stage monomer mixture composed of 6 parts of MMA and 14 parts of BA was added dropwise at a rate of about 30 parts per hour. After the completion of the dropwise addition, the content in the reactor was kept at 70° C. for 90 minutes and was then cooled to give a latex. The average particle size of the latex was measured. The result is shown in Table 1.

The polymerization conversion was 99.5%. The latex was coagulated by salting out with an aqueous solution of calcium chloride, heat-treated by elevating the temperature to 90° C. and dehydrated by a cetrifugal dehydrator. The obtained cake of a resin was washed with an approximately same amount of water as the weight of the resin and was dried at 50° C. for 15 hours by a parallel flow dryer to give a white powder of polymer sample (1). The specific viscosity of the obtained polymer sample (1) was measured. The result is shown in Table 1.

In a Henschel mixer, 100 parts of a polyvinyl chloride (KANEVINYL S-1007 made by Kaneka Corporation, average degree of polymerization 680) was mixed with 5.0 parts of the above polymer sample (1), 6.0 parts of calcium carbonate, 2.0 parts of titanium oxide, 2.0 parts of an octyl tin mercapto-type stabilizer [di-n-octyl tin bis(iso-octyl mercaptoacetate)] (TVS #8831 made by Nitto Kasei Kabushiki Kaisha), 0.6 part of calcium stearate, 0.1 part of hydroxystearic acid (LOXIOL G-21 made by Henkel GmbH), 0.9 part of a dibasic fatty acid alcohol ester (LOXIOL G-60 made by Henkel GmbH) and 0.6 part of a polyethylene wax (ACPE-629A made by Allied Chemical Corporation), and the inner temperature was elevated to 110° C. After cooling, 1.5 parts of sodium bicarbonate was incorporated into the mixture to give a powder compound. The compound was molded by a small-size extruder attached to a Laboplasto mill made by Toyo Seiki Kabushiki Kaisha to give a round rod-like foamed article. The cell state of the foamed article was evaluated, and the expansion ratio was measured. The results are shown in Table 1.

EXAMPLES 2 TO 4 AND COMPARATIVE EXAMPLES 1 AND 2

Polymer samples (2) to (6) were prepared according to the recipe shown in Table 1 in the same manner as in Example 1, and the characteristics thereof were measured. Also, round rod-like foamed articles were obtained by incorporating each of the obtained polymer samples (2) to (6) into polyvinyl chloride in the same manner as in Example 1, and were evaluated. The results are shown in Table 1.

TABLE 1

|  |  | Ex. 1 | Ex. 2 | Ex. 3 | Ex. 4 | Com. Ex. 1 | Com. Ex. 2 |
|---|---|---|---|---|---|---|---|
| Polymer sample No. |  | (1) | (2) | (3) | (4) | (5) | (6) |
| Composition (part) |  |  |  |  |  |  |  |
| Polymer sample |  |  |  |  |  |  |  |
| 1st stage mixture | MMA | 68 | 68 | 68 | 68 | 68 | 68 |
|  | BA | 12 | 12 | 12 | 12 | 12 | 12 |

TABLE 1-continued

|  |  | Ex. 1 | Ex. 2 | Ex. 3 | Ex. 4 | Com. Ex. 1 | Com. Ex. 2 |
|---|---|---|---|---|---|---|---|
| 2nd stage mixture | MMA | 6 | 6 | 6 | 6 | 6 | 6 |
|  | BA | 14 | 14 | 14 | 14 | 14 | 14 |
| Initiator |  | 0.01 | 0.007 | 0.003 | 0.001 | 0.03 | 0.1 |
| Emulsifier |  | 0.7 | 0.7 | 0.7 | 0.7 | 0.5 | 0.5 |
| Results of evaluation |  |  |  |  |  |  |  |
| Polymerization converstion (%) |  | 99.5 | 99.7 | 99.5 | 99.4 | 99.2 | 99.4 |
| Specific viscosity of polymer sample |  | 0.74 | 0.82 | 0.92 | 1.06 | 0.60 | 0.33 |
| Average particle size of latex (μm) |  | 0.15 | 0.16 | 0.16 | 0.16 | 0.16 | 0.16 |
| Expandability | Expansion ratio (times) | 5.1 | 5.4 | 5.6 | 5.8 | 3.8 | 2.6 |
|  | Cell state | ○ | ○ | ○ | ○ | Δ | Δ |

From the results shown in Table 1, it is understood that compositions having a good expandability are obtained when polymer samples (1) to (4) having a specific viscosity of not less than 0.73, but no sufficient expandability is obtained when polymer samples (5) and (6) having a specific viscosity of less than 0.73, and accordingly the specific viscosity of the polymer is required to be not less than 0.73 for obtaining the effects of the present invention.

EXAMPLES 5 TO 7 AND COMPARATIVE EXAMPLES 3 AND 4

Foamed articles were prepared in the same manner as in Example 3 except that the amount of polymer sample (3) was changed as shown in Table 2 instead of 5.0 parts per 100 parts of polyvinyl chloride in order to evaluate a change in expandability when the amount of polymer sample (3) incorporated into polyvinyl chloride was changed. The expandability of the foamed articles was evaluated. The results are shown in Table 2, provided that in Comparative Example 4 a foamed article suitable to evaluate the expandability could not be obtained due to non-uniformity of a composition obtained.

TABLE 2

|  | Ex. 3 | Ex. 5 | Ex. 6 | Ex. 7 | Com. Ex. 3 | Com. Ex. 4 |
|---|---|---|---|---|---|---|
| Polymer sample No. | (3) | (3) | (3) | (3) | (3) | (3) |
| Amount (part) | 5 | 10 | 15 | 20 | 0.1 | 40 |
| Expandability |  |  |  |  |  |  |
| Expansion ratio (times) | 5.6 | 6.4 | 6.6 | 6.8 | 1.2 | — |
| Cell state | ○ | ○ | ○ | ○ | ○ | — |

From the results shown in Table 2, it is understood that the compositions incorporated with the processing aid according to the present invention exhibit a good expandability, but sufficient expandability is not obtained if the amount of the processing aid is small as shown in Comparative Example 3.

EXAMPLES 8 TO 13 AND COMPARATIVE EXAMPLES 5 TO 7

Foamed articles were prepared in the same manner as in Example 3 except that the kind and amount of the thermally decomposable blowing agent were changed as shown in Table 3. The expandability of the foamed articles was evaluated. The results are shown in Table 3.

In the table, SBC denotes sodium bicarbonate, and ADCA denotes azodicarbonamide.

TABLE 3

| Example No. | 8 | 9 | 10 | 11 | 12 | 13 | Com. Ex. 5 | Com. Ex. 6 | Com. Ex. 7 |
|---|---|---|---|---|---|---|---|---|---|
| Polymer sample | | | | | | | | | |
| Sample number | (3) | (3) | (3) | (3) | (3) | (3) | (3) | (3) | (3) |
| Amount (part) | 5 | 5 | 5 | 5 | 10 | 20 | 10 | 20 | 10 |
| Blowing Agent | | | | | | | | | |
| Kind | SBC | SBC | SBC | SBC | SBC | SBC | SBC | ADCA | ADCA |
| Amount (part) | 0.8 | 1.0 | 1.5 | 1.8 | 1.8 | 1.9 | 0.1 | 1.0 | 1.8 |
| Expandability | | | | | | | | | |
| Expansion ratio (times) | 5.1 | 5.3 | 5.4 | 5.6 | 5.2 | 6.5 | 1.2 | 3.0 | 3.2 |
| Cell State | ○ | ○ | ○ | ○ | ○ | ○ | ○ | ○ | ○ |

From the results shown in Table 3, it is understood that as shown in Comparative Example 5, a sufficient expansion ratio is not obtained if the amount of a thermally decomposable inorganic blowing agent is small. It is also understood that a sufficient expandability is not obtained also in the case that thermally decomposable blowing agents other than a thermally decomposable inorganic blowing agent are used, as shown in Comparative Examples 6 and 7.

INDUSTRIAL APPLICABILITY

The expandable vinyl chloride resin composition of the present invention provides foamed articles having an expansion ratio as high as about 5–10 and, moreover, having a good state of cells, by the use of thermally decomposable inorganic blowing agents without the use of organic solvent blowing agents. Therefore, cost reduction is possible since an existing extruder can be used, and also the range of uses is expanded.

What is claimed is:

1. An expandable vinyl chloride resin composition comprising 100 parts by weight of a vinyl chloride resin, 0.5 to 30 parts by weight of, as a processing aid, a (meth)acrylic acid ester polymer having a specific viscosity of not less than 0.73 measured at 30° C. with respect to a solution of 0.1 g of the polymer dissolved in 100 ml of chloroform, and not less than 0.3 part by weight to less than 2 parts by weight of a thermally decomposable inorganic blowing agent, said composition containing no organic solvent blowing agent, wherein the resultant expandability ratio is not less than 5:1, expandability being defined as (specific gravity of non-foamed molding)/(specific gravity of foamed molding).

2. The composition of claim 1, wherein said thermally decomposable inorganic blowing agent is at least one member selected from the group consisting of sodium bicarbonate, potassium bicarbonate, ammonium bicarbonate, sodium carbonate and ammonium carbonate.

3. The composition of claim 1, wherein said (meth)acrylic acid ester polymer is a polymer comprising 50 to 100% by weight of units of methyl methacrylate, 0 to 50% by weight of units of a monomer selected from the group consisting of acrylic acid esters and methacrylic acid esters excepting methyl methacrylate, and 0 to 20% by weight of units of other vinyl monomers copolymerizable therewith.

4. The composition of claim 3, wherein said other vinyl monomer is a member selected from the group consisting aromatic vinyl compounds and unsaturated nitrite compounds.

5. The composition of claim 1, wherein said (meth)acrylic acid ester polymer has a specific viscosity 0.8 to 1.6.

6. A foamed molding obtained by molding the composition of claim 1 by extrusion.

* * * * *